United States Patent
Matsuoka (10) Patent No.: US 10,204,400 B2
(45) Date of Patent: Feb. 12, 2019

(54) IMAGE PROCESSING APPARATUS, IMAGING APPARATUS, IMAGE PROCESSING METHOD, AND RECORDING MEDIUM

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 15/189,125

(22) Filed: Jun. 22, 2016

(65) Prior Publication Data
US 2016/0381342 A1 Dec. 29, 2016

(30) Foreign Application Priority Data
Jun. 26, 2015 (JP) .................................. 2015-128533

(51) Int. Cl.
G06T 5/00 (2006.01)
H04N 13/271 (2018.01)
H04N 5/232 (2006.01)
G06T 5/50 (2006.01)
G06T 3/40 (2006.01)

(52) U.S. Cl.
CPC .............. G06T 5/002 (2013.01); G06T 3/403 (2013.01); G06T 5/50 (2013.01); H04N 5/232 (2013.01); H04N 13/271 (2018.05); G06T 2207/10028 (2013.01)

(58) Field of Classification Search
CPC ................. H04N 5/217; H04N 5/2226; H04N 5/357–5/365; H04N 13/025; H04N 13/0271; H04N 2013/0081; H04N 5/00
See application file for complete search history.

(56) References Cited

U.S. PATENT DOCUMENTS

| 8,983,177 | B2 | 3/2015 | Tuzel et al. | |
| 2013/0294683 | A1* | 11/2013 | Yamashita | H04N 13/0018 382/154 |
| 2015/0104074 | A1* | 4/2015 | Vondran, Jr. | G06T 5/002 382/106 |
| 2015/0116464 | A1* | 4/2015 | Tanaka | H04N 13/0271 348/49 |
| 2016/0105636 | A1* | 4/2016 | Guo | H04N 19/597 348/14.15 |

FOREIGN PATENT DOCUMENTS

JP  2014-150521 A  8/2014

* cited by examiner

*Primary Examiner* — Paul M Berardesca
(74) *Attorney, Agent, or Firm* — Cowan, Liebowitz & Latman, P.C.

(57) ABSTRACT

An imaging unit images an object through an imaging optical system so as to acquire image data. A depth map acquiring unit acquires information relating to a depth distribution of an object as depth map data. The resolution of depth map data is relatively lower than the resolution of image data which has been imaged. A depth map shaping unit references image data of an object so as to conform to the resolution of a depth map, when it performs shaping of the depth map based on image data of the object.

11 Claims, 7 Drawing Sheets

IMAGE PROCESSING APPARATUS, IMAGING APPARATUS, IMAGE PROCESSING METHOD, AND RECORDING MEDIUM

BACKGROUND OF THE INVENTION

Field of the Invention

The present invention relates to a technique for shaping information relating to a depth distribution of an object by acquiring it.

Description of the Related Art

In a distance map representing a distribution of distance information (Hereinafter, distance information is referred to as "depth information") from an imaging apparatus to an object, a process (distance map shaping process) for accommodating a distance value corresponding to the contours of the object to the correct contours by using a captured image is known. Japanese Patent Laid-Open No. 2014-150521 discloses a method that performs upsampling using a distance map with a low resolution and a captured image with a high resolution in order to generate a high resolution distance map (Hereinafter, a distance map is referred to as a "depth map").

However, in Japanese Patent Laid-Open No. 2014-150521, no disclosure is given about shaping a low resolution depth map without up-sampling to the same degree as the resolution of the captured image as output.

SUMMARY OF THE INVENTION

The present invention provides an image processing apparatus that processes map data by acquiring information relating to a depth distribution of an object, wherein the image processing apparatus achieves a reduction in power requirements and performs shaping with more accuracy even if the resolution of output map data is lower than the original resolution of the image data of the object that is referenced.

According to an aspect of the present invention, an image processing apparatus is provided that includes a first acquiring unit configured to acquire information relating to a depth distribution of an object as map data with a first resolution; a second acquiring unit configured to acquire image data of the object as image data with a second resolution higher than the first resolution; and a shaping unit configured to shape the map data based on the image data acquired by the second acquiring unit, wherein the shaping unit shapes the map data with the first resolution with reference to the image data of which the resolution has been changed from the second resolution to the first resolution.

Further features of the present invention will become apparent from the following description of exemplary embodiments with reference to the attached drawings.

DESCRIPTION OF THE EMBODIMENTS (First Embodiment)

Hereinafter, preferred embodiments of the present invention will be described with reference to the attached drawings. A description will be given of an example in which a digital camera is applied as an image processing apparatus according to the embodiments.

Figure 1:
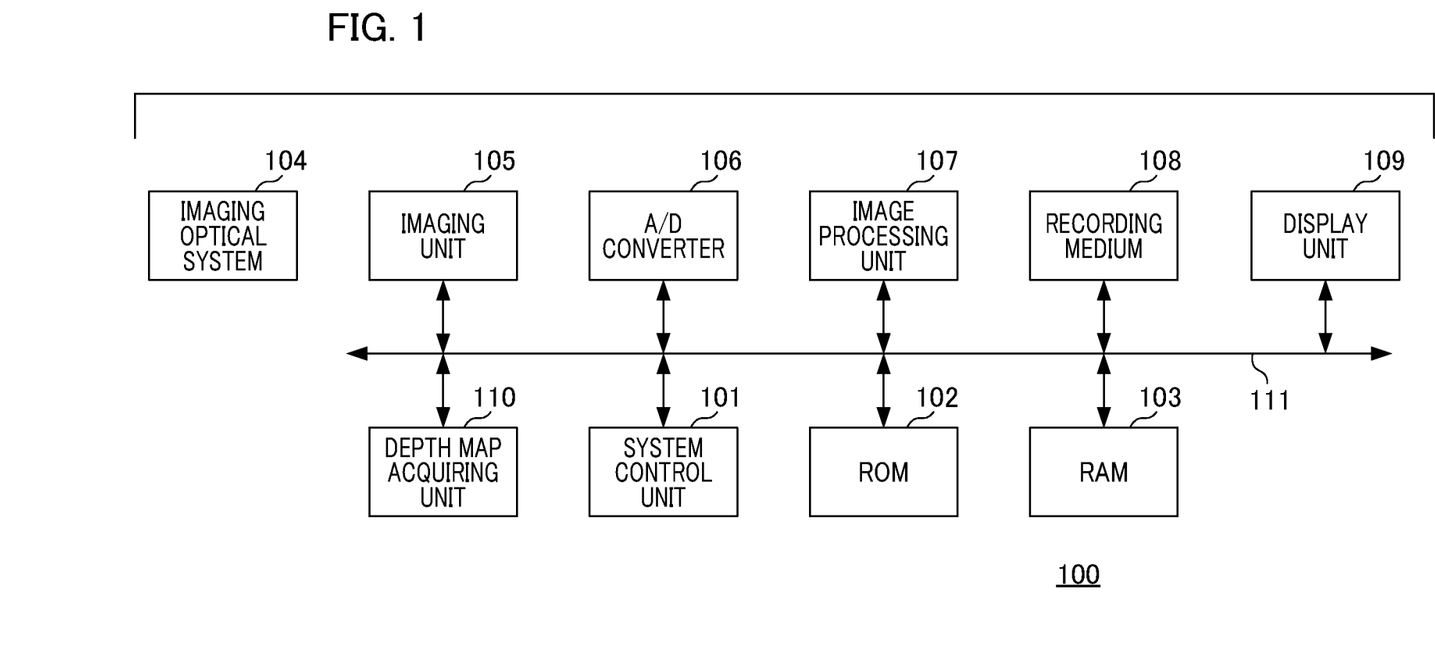
FIG. 1 is a block diagram illustrating a functional configuration of a digital camera according to a first embodiment of the present invention.

FIG. 1 is a block diagram illustrating a functional configuration of a digital camera according to the present embodiment. The components shown in FIG. 1 can mutually transmit/receive a signal via a bus 111.

A system control unit 101 includes a CPU (Central Processing Unit). The system control unit 101 reads out a program for controlling the operation and the process of the components of a digital camera 100 from a ROM (Read Only Memory) 102 and expands it to a RAM (Random Access Memory) 103 for execution. The ROM 102 is a non-volatile memory capable of rewriting data, which stores not only programs for controlling the operation and the process of the digital camera 100, parameters required for the operation of the components, and the like. For example, data such as an exit pupil depth or the like as lens information required for focus detection or the like is stored in the ROM 102. The RAM 103 is a volatile memory capable of rewriting data, which is used as a temporal storage area for data output from the process of the digital camera 100.

An imaging optical system 104 images light from an object onto an imaging unit 105. The imaging optical system 104 includes a lens and an aperture. The aperture performs the adjustment of light amount at the time of picture-taking by adjusting the opening diameter of the imaging optical system 104. The imaging unit 105 includes imaging elements including a CCD (Charge Coupled Device) sensor, a CMOS (Complementary Metal Oxide Semiconductor) sensor, and the like. The imaging element performs photoelectric conversion of an optical image imaged by the imaging optical system 104, and then outputs the obtained analog image signal to an A (analog)/D (digital) converter 106. The A/D converter 106 performs A/D conversion processing for an analog image signal which has been input thereto, and then outputs the resulting digital image data to the RAM 103 for storage.

An image processing unit 107 performs processing such as white balance adjustment, color interpolation, reduction/enlargement, filtering, or the like for image data stored in the RAM 103. A recording medium 108 is a releasable memory card or the like in which an image stored in the RAM 103, which has been processed by the image processing unit 107, an image A/D-converted by the A/D converter 106, or the like is recorded as recording image data. A display unit 109 includes a display device such as an LCD (Liquid Crystal Display). The display unit 109 displays various types of information such as a see-through display of an object image based on image pick-up data acquired by the imaging unit 105.

A depth map acquiring unit 110 is a depth censor module acquires depth information about an object using a predetermined detecting method. For example, the depth map acquiring unit 110 acquires information relating to a depth distribution of an object using a "Time of Flight (TOF)" method. In the TOF method, the depth information of an object is acquired based on a time taken until exit light emitted from a light source, which has been reflected by the object, is received by a detecting unit and the speed of light. The depth map acquiring unit 110 outputs depth map data with a resolution (resolution, the number of samples) lower than the resolution (the number of pixels) of image data of the object as digital data to the RAM 103 for storage.

Figure 2:
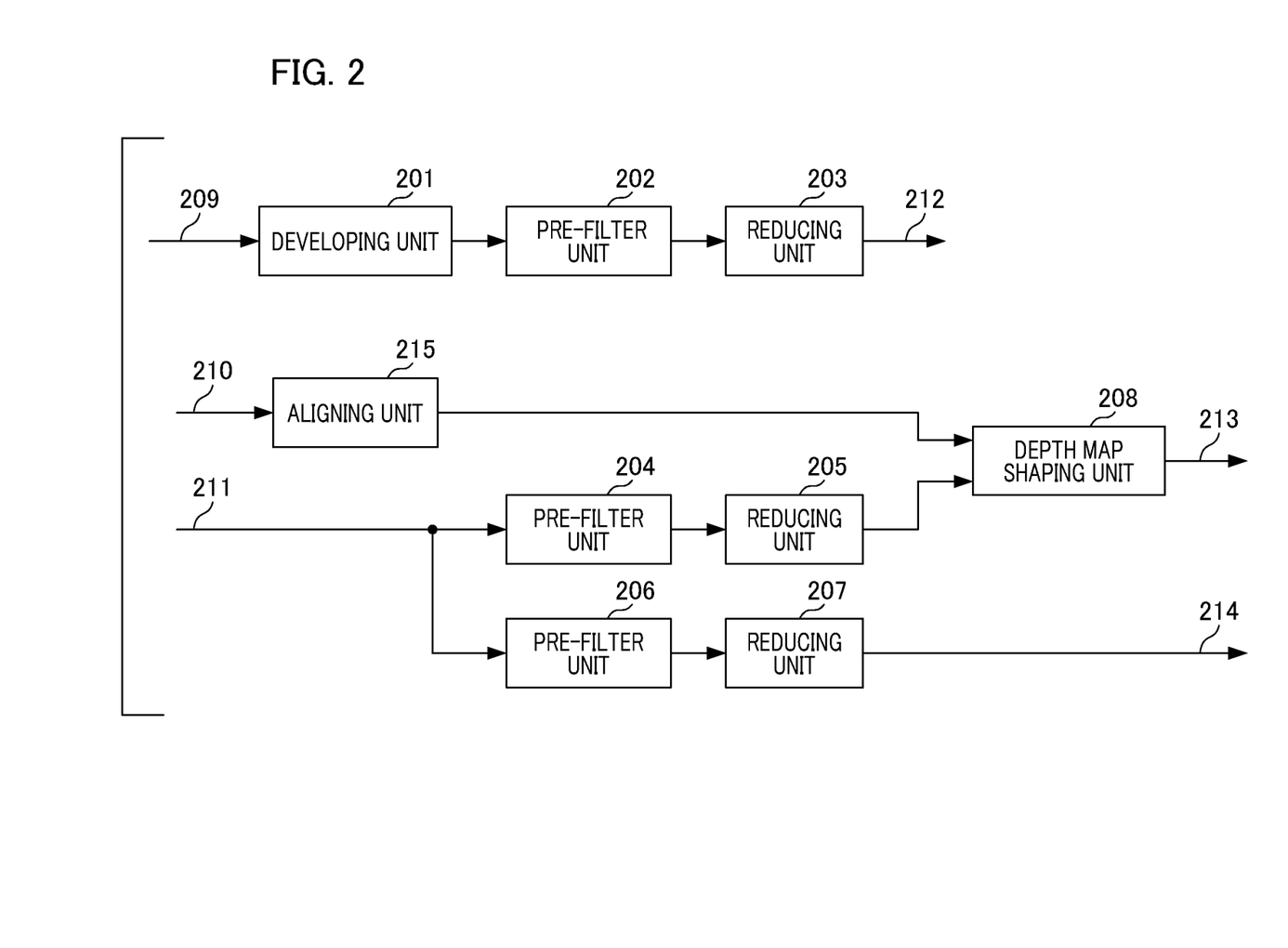
FIG. 2 is a block diagram illustrating a functional configuration of an image processing unit according to the first embodiment of the present invention.

FIG. 2 is a block diagram illustrating an exemplary configuration of the image processing unit 107 shown in FIG. 1.

A developing unit 201 acquires digital image data subjected to A/D conversion as a captured image input 209, and performs development processing consisting of white balance adjustment, color interpolation, or the like so as to generate a developed image for video recording. Data of the developed image is processed by a pre-filter unit 202, and then is reduced by a reducing unit 203, so that the developed image data is subject to resize processing so as to conform to an output resolution according to a video image output 212. In the present embodiment, the input resolution at the captured image input 209 is set to 8000×4000 pixels and the output resolution at the video image output 212 is set to 2000×1000 pixels. In other words, the resize ratio of the reducing unit 203 is ¼ both in the horizontal direction and in the vertical direction.

Figure 3:
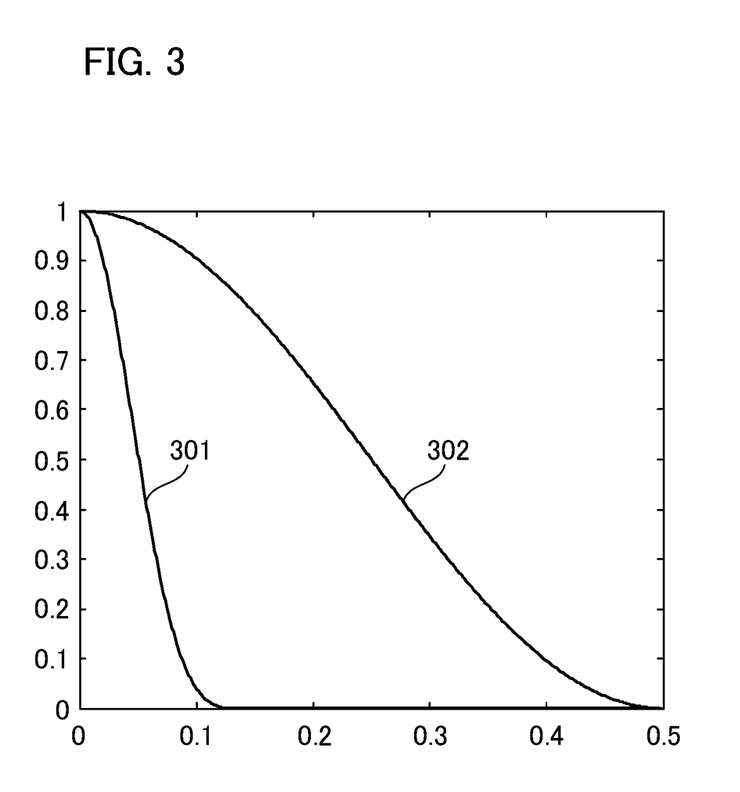
FIG. 3 is a diagram illustrating an exemplary characteristic of a pre-filter unit according to an embodiment of the present invention.

The amplitude-frequency characteristic of the pre-filter unit 202 is determined depending on the resize ratio of the reducing unit 203, and is shown by a graph curve 301 in FIG. 3 as an example. In FIG. 3, the horizontal axis represents a frequency normalized by setting a sampling frequency as 1.0 and the vertical axis represents an amplitude normalized by setting the amplitude at the frequency of 0.0 as 1.0. When the developed image is resized at a ratio of ¼ in the horizontal direction and is resized at a ratio of ¼ in the vertical direction, the pre-filter unit 202 has the characteristic of the graph curve 301. In other words, the graph curve 301 indicates an amplitude-frequency characteristic that blocks a signal of higher frequency than ¼ of 0.5 which is the Nyquist frequency, which is the alias component after resizing, of a developed image.

An aligning unit 215 shown in FIG. 2 acquires data of a depth map input 210, and then performs alignment by correcting a position deviation between an image and a depth map caused by the parallax between the imaging unit 105 and the depth map acquiring unit 110 shown in FIG. 1. More specifically, the aligning unit 215 shifts a depth map by the position deviation amount so as to bring the depth map into alignment with the image. In the present embodiment, alignment is achieved by shifting a depth map by the position deviation amount. The present invention is not limited thereto. Since it suffices that a position deviation between an image and a depth map can be corrected, alignment between the image and the depth map may also be achieved by shifting the image by the position deviation amount.

Image data of a video image input 211 is processed by pre-filter units 204 and 206. First, data subjected to filter processing by the pre-filter unit 204 is resized by a reducing unit 205 so as to conform to the output resolution of the aligning unit 215. In the present embodiment, it is assumed that the output resolution of the aligning unit 215 is 200×100 pixels and the resize ratio of the reducing unit 205 is ¹⁄₁₀ both in the horizontal direction and in the vertical direction. The amplitude-frequency characteristic of the pre-filter unit 204 is determined so as not to suppress the high-frequency component after resizing. The pre-filter unit 204 and the reducing unit 205 are together configured as an image reducing unit, and image data for shaping is output to a depth map shaping unit 208. The amplitude-frequency characteristic of the pre-filter unit 204 is illustrated as a graph curve 302 shown in FIG. 3. The graph curve 302 indicates an amplitude-frequency characteristic that does not suppress a high-frequency component near ¹⁄₁₀ of 0.5 which is a frequency at which a high-frequency component after resizing is present. In the present embodiment, while a description has been given by taking an example of a characteristic shown in the graph curve 302 in FIG. 3 in terms of the amplitude-frequency characteristic of the pre-filter unit 204, the present invention is not limited thereto. For example, pre-filter processing may also be invalid per se so as not to suppress a high-frequency component after resizing.

Data subjected to filter processing by a pre-filter unit 206 is resized by a reducing unit 207 so as to conform to an output resolution according to a displayed image output 214. The pre-filter unit 206 and the reducing unit 207 are together configured as an image reducing unit, and image data for display is output to the display unit 109. In the present embodiment, it is assumed that an input resolution at the video image input 211 is 2000×1000 pixels and an output resolution at the displayed image output 214 is 500×250 pixels. In other words, the resize ratio of the reducing unit 207 is ¼ both in the horizontal direction and in the vertical direction. As in the case of the pre-filter unit 202, the amplitude-frequency characteristic of the pre-filter unit 206 is a characteristic shown by the graph curve 301 in FIG. 3, and the pre-filter unit 206 suppresses an alias generated by the reduction of an image to a greater extent than the pre-filter unit 204.

The depth map shaping unit 208 shown in FIG. 2 performs shaping for a depth map using the depth map output from the aligning unit 215 and the image for shaping output from the reducing unit 205. Hereinafter, a depth map subjected to shaping is referred to as a "shaped depth map". In the present embodiment, it is assumed that the output resolution according to a shaped depth map output 213 is 200×100 pixels which is the same output resolution as that of the aligning unit 215. A description will be given below of the shaping of the depth map.

The depth map shaping unit 208 performs bilateral filter processing for a depth map with reference to an image for shaping. For the bilateral filter processing, given that the filter result of a pixel-of-interest position "p" is denoted by "Jp", Jp is represented by the following Equation (1):

$$Jp = (1/Kp)\Sigma I1q \cdot f(|p-q|) \cdot g(|I2p - I2q|) \quad (1)$$

The meanings of the symbols in Equation (1) are as follows:
q: a surrounding pixel position
Ω: a region to be accumulated centered on a pixel-of-interest position p
Σ: accumulation in the range of q∈Ω
I1q: a depth map signal value at a surrounding pixel position q
f(|p−q|): Gaussian function centered on a pixel-of-interest position p I2p: a pixel value of an image for shaping at a pixel-of-interest position p I2q: a pixel value of an image for shaping at a surrounding pixel position q g(|I2p−I2q|): Gaussian function centered on a pixel value I2p for an image for shaping Kp: a normalization coefficient, an accumulated value by an f·g weight.

If the difference between the pixel value I2p at the pixel-of-interest position p and the pixel value I2q at the surrounding pixel position q is small, i.e., if the pixel value of the pixel of interest in the image for shaping becomes closer to the pixel values of the surrounding pixels, the f·g weight (the weight of smoothing) for the surrounding pixels increases.

Figure 4A:
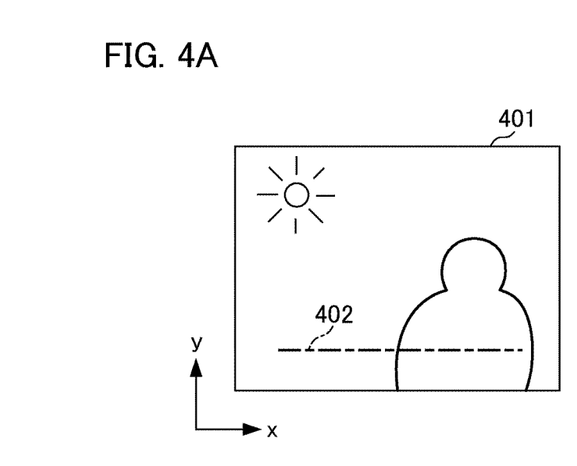
FIGS. 4A to 4D are diagrams illustrating a process performed by a depth map shaping unit according to an embodiment of the present invention.
Figure 4B:
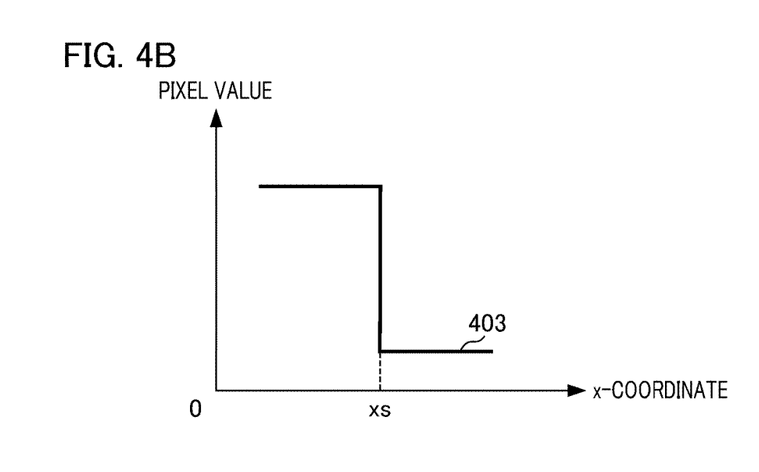
Figure 4C:
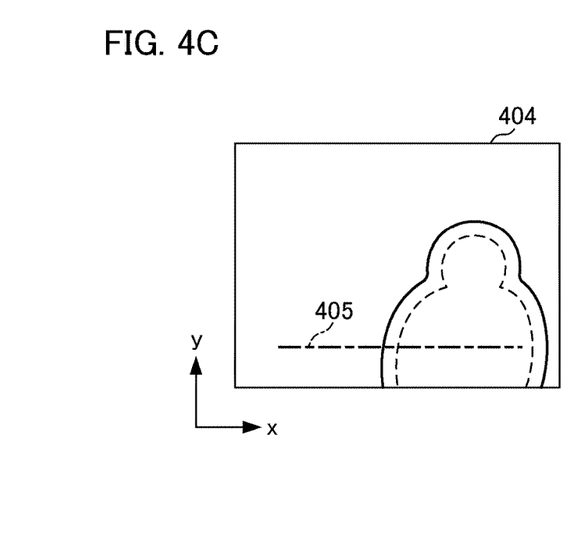

FIGS. 4A to 4D are diagrams illustrating a process performed by the depth map shaping unit 208 shown in FIG. 2. In FIGS. 4A and 4C, a horizontal direction in the paper sheet is defined as the x-direction with the right direction being defined as the positive x-direction and a vertical direction perpendicular to the x-direction in the paper sheet is defined as the y-direction with the upward direction being defined as the positive y-direction.

FIG. 4A illustrates an image for shaping 401 after resizing, where objects are a person on the right of the screen and a background. FIG. 4B represents a pixel value profile 403 for the cross-section at the position shown by a chain-dotted line 402 in FIG. 4A, where the horizontal axis represents the coordinate x and the vertical axis represents the pixel value. The shape of a pixel value profile 403 is in a stepped shape such that a pixel value largely varies (decreases) at the position of xs in the direction of an increase in the coordinate x. The pre-filter unit 204 for resizing shown in FIG. 2 performs filter processing using an amplitude-frequency characteristic which does not suppress the high-frequency component after resizing. Thus, the pixel value profile 403 keeps a sharp edge along the contours of a person.

Figure 4D:
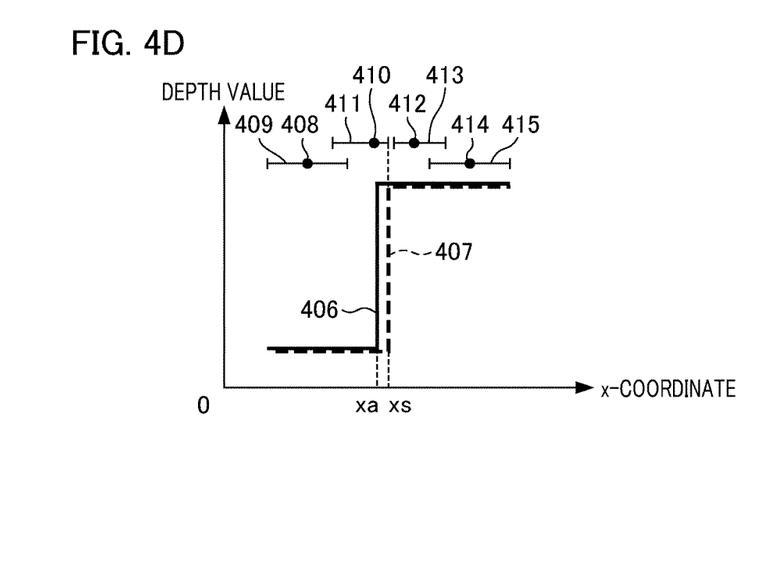

FIG. 4C illustrates a depth map 404. A portion shown by a dotted line in FIG. 4C represents the contours of a person in the image for shaping shown in FIG. 4A. FIG. 4D represents a depth value profile 406 for the cross-section at the position shown by a chain-dotted line 405 in FIG. 4B (corresponding to the position shown by the chain-dotted line 402 in FIG. 4A) by a solid line, where the horizontal axis represents the coordinate x and the vertical axis represents a depth value. For the depth value, it is assumed that the depth value of a background far away from the position of the camera is small and the depth value of a person positioned closer to the camera is large. In the case in FIG. 4C, the contours of a person in a depth map protrude outwardly of the contours of a person in a correct image for shaping. The shape of the depth value profile 406 shown by the solid line in FIG. 4D is in a stepped shape such that a pixel value largely varies (increases) at the position of xa smaller than xs in the direction of an increase in the coordinate x.

The pixel-of-interest positions p in Equation (1) are shown by black dots 408, 410, 412, and 414, respectively. Each of segments 409, 411, 413, and 415 indicates an area with a greater g-value in Equation (1), i.e., a range of smoothing. The pixel value profile 403 of an image for shaping changes abruptly at the position xs corresponding to the contours of the person. Thus, at the positions of the black dots 410 and 412 indicating the pixel-of-interest positions in the vicinity of the contours of the person, the ranges of smoothing become the segments 411 and 413 so as to follow the contours of the person in the correct image for shaping.

Consequently, when the values of the filter results Jp in Equation (1) are plotted, a graph line 407 indicated by a dotted line is obtained. The shape of the graph line 407 is in a stepped shape such that it largely varies (increases) at the position of xs in the direction of an increase in the coordinate x. In other words, the shape of the depth map allows the contours of the person in the depth map to be shaped to the correct contours (the contours of the person in the image for shaping).

According to the present embodiment, even when map data with a resolution relatively lower than the resolution of input image data is shaped and output with the resolution being held in low.

(Second Embodiment)

Next, a description will be given of a second embodiment of the present invention. In the present embodiment, a description will be given of processing for generating a map data relating to a depth distribution of an object by acquiring a plurality of image data exhibiting parallax. The portions which are basically the same as those of the first embodiment in the imaging apparatus according to the present embodiment are denoted by the same reference numerals as already used, and the detailed description thereof will be omitted but the following description is focusing on the differences from the first embodiment.

Figure 5:
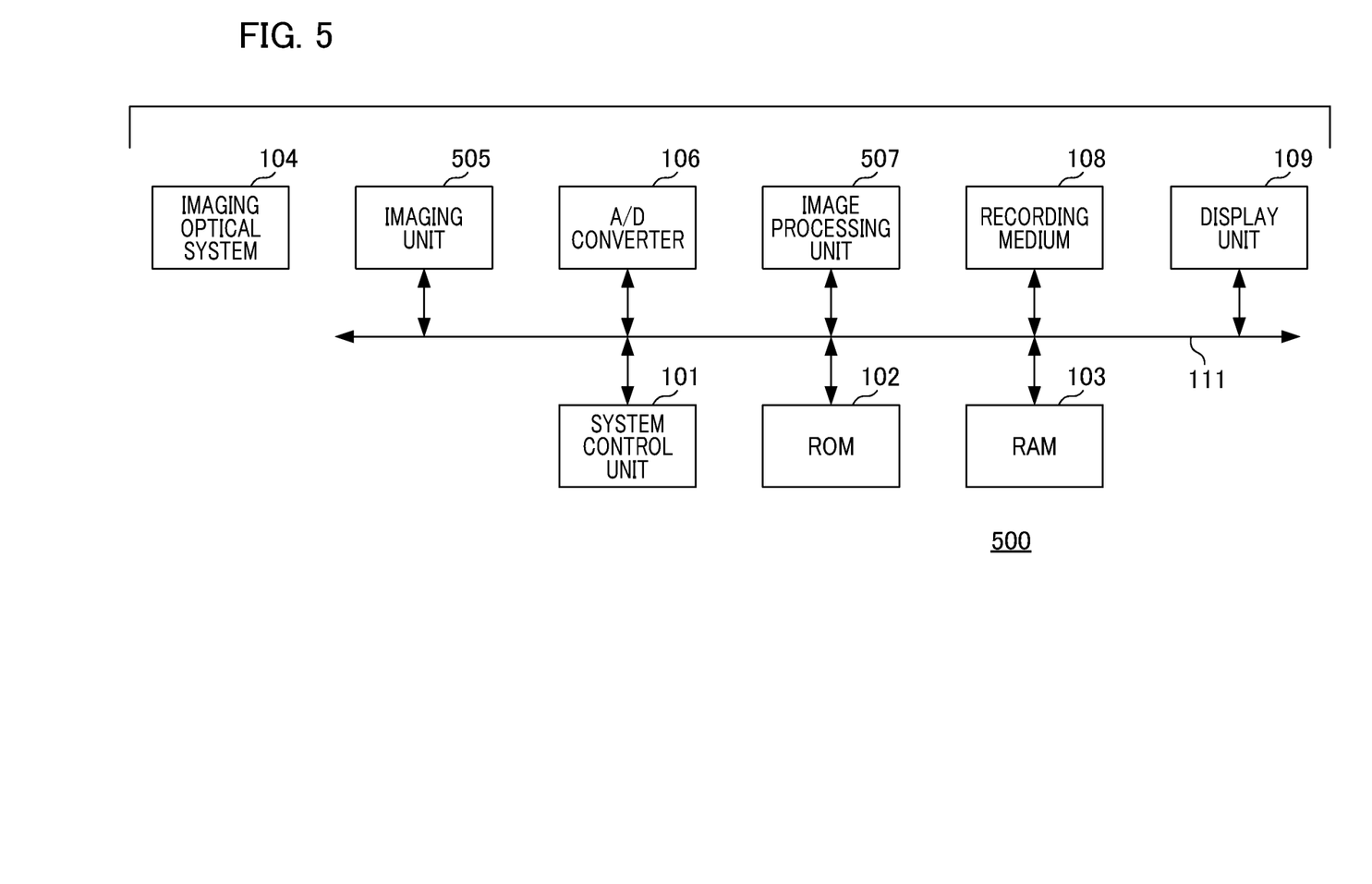
FIG. 5 is a block diagram illustrating a functional configuration of a digital camera according to a second embodiment of the present invention.

FIG. 5 is a block diagram illustrating a functional configuration of a digital camera 500 according to the present embodiment. Differences from the configuration shown in FIG. 1 are an imaging unit 505 and an image processing unit 507.

Figure 7A:
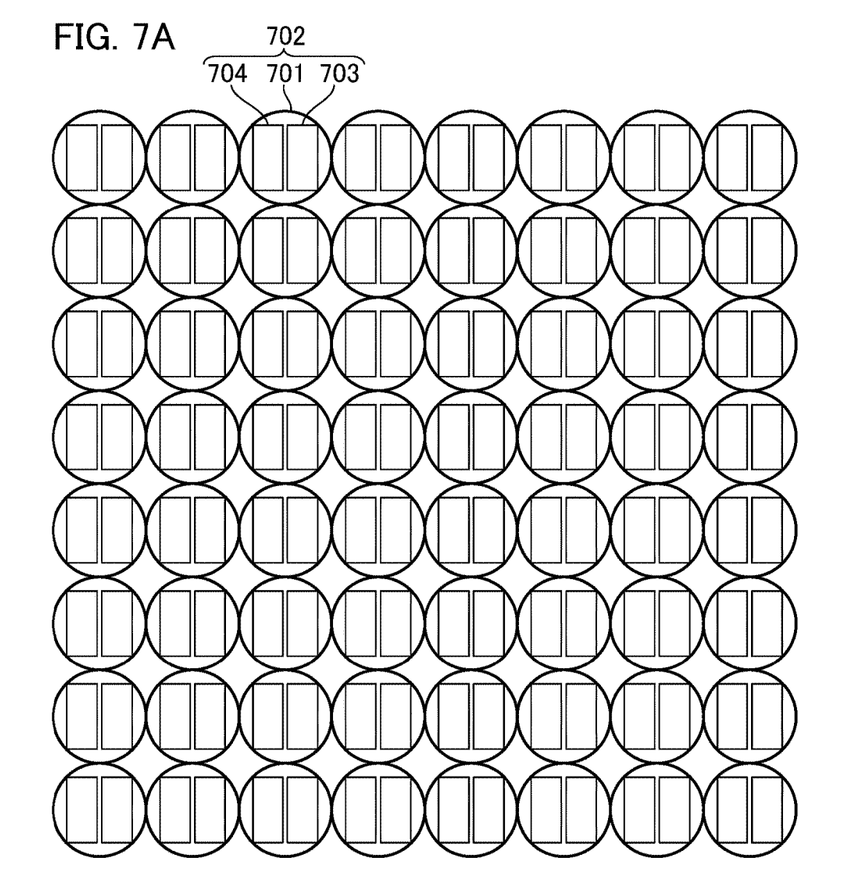
FIGS. 7A and 7B are diagrams illustrating an exemplary configuration of an imaging unit according to the second embodiment of the present invention.
Figure 7B:
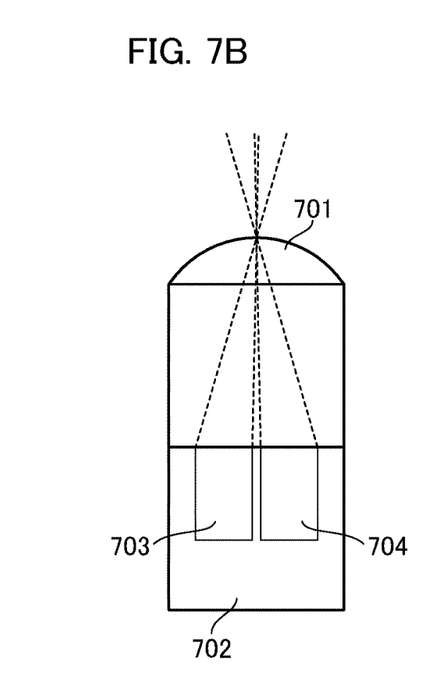

FIG. 7A is a diagram illustrating the pixel array of the imaging unit 505. FIG. 7B is an enlarged schematic diagram illustrating a cross sectional structure of one pixel portion 702. In the imaging unit 505, a plurality of pixel portions 702 is arranged in an ordered two-dimensional array. One pixel portion 702 is comprised of a microlens 701 and a pair of photoelectric converters 703 and 704. In the present embodiment, it is assumed that an image A is generated from an output signal of a first photoelectric converter 703 and an image B is output from an output signal of a second photoelectric converter 704. By means of such a configuration, a pair of light beams passing through the different pupil areas in the imaging optical system 104 can be imaged as optical images, respectively, to output as a pair of images, i.e., an image A and an image B. The amount of defocus is calculated by correlation operation of data of the image A and the image B. Then, a defocus map representing the spatial distribution (distribution on a two-dimensional plane of a captured image) of the amount of defocus is generated, resulting in obtaining data relating to a depth distribution of an object. The direction and the number of division of the photoelectric converters in a pixel portion can be arbitrarily changed depending on its specification, and image acquisition processing is performed by the a plurality of photoelectric converters subjected to division so as to obtain a plurality of image data exhibiting parallax.

Figure 6A:
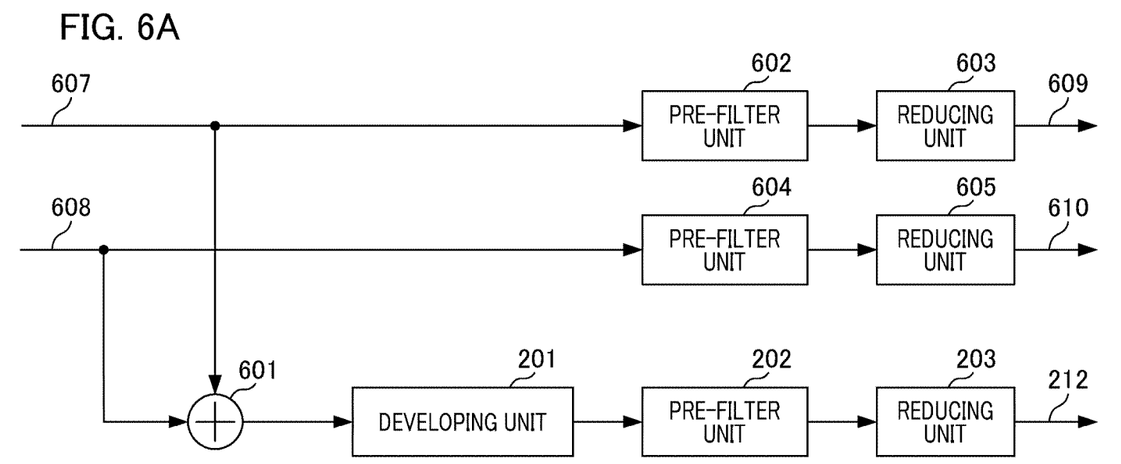
FIGS. 6A and 6B are block diagrams illustrating a functional configuration of an image processing unit according to the second embodiment of the present invention.
Figure 6B:
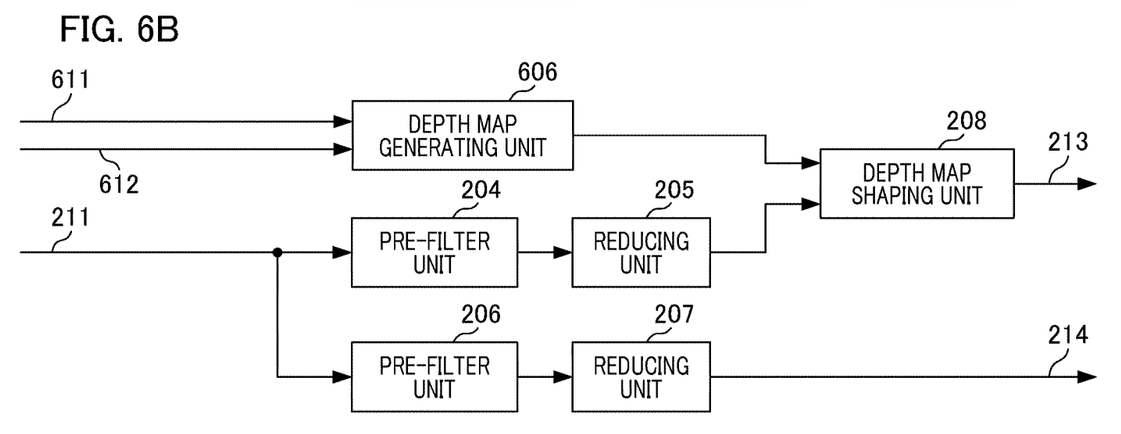

FIG. 6 is a block diagram illustrating a configuration of the image processing unit 507 shown in FIG. 5. The components (reference numerals 201 to 208 and reference numerals 211 to 214) are the same as those described in the first embodiment with reference to FIG. 2.

FIG. 6A illustrates an adding unit 601, a developing unit 201, a plurality of pre-filter units 202, 602, and 604, and a plurality of reducing units 203, 603, and 605. An image A input 607 and an image B input 608 are added by the adding unit 601. The adding unit 601 sums data of the image A and the image B so as to digitally reconfigure an optical image obtained by light beams passing through the entire pupil area in the imaging optical system 104. The adding unit 601 outputs data subjected to addition processing to the developing unit 201. The developing unit 201 processes the image data acquired from the adding unit 601 to output developed image data. The developed image data is processed by the pre-filter unit 202 (for the amplitude-frequency characteristic, see 301 in FIG. 3), and then is processed by the reducing unit 203. Image data is resized by reduction processing so as to conform to an output resolution according to the video image output 212. In the present embodiment, the input resolution of the image A input 607 and the image B input 608 is set to 8000×4000 pixels and the output resolution of the video image output 212 is set to 2000×1000 pixels. In other words, the resize ratio of the reducing unit 203 is ¼ both in the horizontal direction and in the vertical direction.

For the image A input 607, processing is performed by a pre-filter unit 602 and then by a reducing unit 603 to thereby obtain an image A output for ranging 609. For the image B input 608, processing is performed by a pre-filter unit 604 and then by a reducing unit 605 to thereby obtain an image B output for ranging 610. In the present embodiment, it is assumed that an output resolution of the image A output for ranging 609 and the image B output for ranging 610 is 2000×1000 pixels. In other words, the resize ratio of the reducing unit 603 and the reducing unit 605 is ¼ both in the horizontal direction and in the vertical direction. The amplitude-frequency characteristic of the pre-filter unit 602 and the pre-filter unit 604 is a characteristic shown by the graph curve 301 in FIG. 3.

FIG. 6B illustrates a depth map generating unit 606, a depth map shaping unit 208, a plurality of pre-filter units 204 and 206, and a plurality of reducing units 205 and 207. An image A input for ranging 611 corresponds to the image A output for ranging 609 shown in FIG. 6A, and an image B input for ranging 612 corresponds to the image B output for ranging 610 shown in FIG. 6A.

The depth map generating unit 606 calculates the amount of defocus for each pixel-of-interest position as information relating to a depth distribution of an object using input images from the image A input for ranging 611 and the image B input for ranging 612. The processing for calculating the amount of defocus from the image A and the image B is as follows:

The signal sequences of the image A at the pixel-of-interest position are denoted by $E(1)$ to $E(m)$, and the signal sequences of the image B at the pixel-of-interest position are denoted by $F(1)$ to $F(m)$. For the signal sequences $E(1)$ to $E(m)$ of the image A, the correlation amount $C(k)$ in the shifted amount k between two signal sequences is computed by using the following Equation (2) by relatively shifting the signal sequences $F(1)$ to $F(m)$ of the image B:

$$C(k)=\Sigma|E(n)-F(n+k)| \quad (2)$$

In Equation (2), $\Sigma$ operation means operation for calculating the sum of n. In the $\Sigma$ operation, the range of each of. The shifted amount k is an integer value which represents a relative amount of shift as unit of a detection pitch of a pair of data.

Among the operation results in Equation (2), the correlation amount $C(k)$ is minimized at the amount of shift (the shifted amount k) where a pair of signal series is highly correlated. In the following, k when the correlation amount $C(k)$ is minimized is denoted by "kj". By means of a three-point interpolation process with use of the following Equations (3) to (5), the amount of shift x is calculated for obtaining the minimum value $C(x)$ for the continuous correlation amount.

$$x=kj+D/SLOP \quad (3)$$

$$D=\{C(kj-1)-C(kj+1)\}/2 \quad (4)$$

$$SLOP=MAX\{C(kj+1)-C(kj),C(kj-1)-C(kj)\} \quad (5)$$

The amount of defocus (denoted by "DEF") is determined from the amount of shift x calculated in Equation (3) using the following Equation (6):

$$DEF=KX\cdot PY\cdot x \quad (6)$$

KX shown in Equation (6) is a conversion factor for determining the magnitude of an opening angle to the gravity center of light beams passing through a pair of pupil areas, and PY is a detection pitch.

The depth map generating unit 606 extracts pixel data from a plurality of image data at a predetermined pixel interval. For example, the depth map generating unit 606 executes calculation from Equation (2) to Equation (6) on every eleventh pixel in the horizontal direction and every eleventh pixel in the vertical direction with respect to image data having an input resolution of 2000×1000 pixels. In this manner, the amount of defocus of 200×100 is calculated and depth calculation is further performed, so that depth map data is output with a resolution of 200×100.

The depth map shaping unit 208 acquires depth map data output from the depth map generating unit 606 and image data for shaping processed by the pre-filter unit 204 and the reducing unit 205 so as to generate a shaped depth map. The shaped depth map data is output as the shaped depth map output 213. In the present embodiment, the output resolution of the shaped depth map output 213 is 200×100 which is the same as the output resolution from the depth map generating unit 606.

The depth map generating unit 606 outputs depth map data with a resolution lower than the input resolution. However, since only the number of coordinates for calculating the amount of defocus is decreased, the contours of the person in the depth map 404 shown in FIG. 4 are not smeared due to blurring.

According to the present embodiment, even when a low resolution map is shaped and output while holding a low resolution after the generation of a low resolution map from a plurality of high resolution images exhibiting parallax, map data can still be correctly shaped. As described above, while a description has been given for preferred embodiments of the present invention, the present invention is not limited to these embodiments but may be modified and changed in various ways within the range of the scope of the present invention.

In the present embodiment, a defocus map is calculated as information relating to a depth distribution of an object, and the resulting map data is used. The present invention is not limited thereto but a depth map obtained by calibrating each amount of defocus into an object distance (distance in the depth direction of an object) may also be used in the above embodiments. Likewise, a depth map indicating a distribution of an object distance is also applicable to the following embodiments.

The present invention can be realized by the processing in which a program for realizing one or more functions of the above-described exemplary embodiment is supplied to a system or an apparatus via a network or a storage medium, and one or more processors of the computer of that system or the apparatus read and execute the program. In addition, the present invention can be realized with a circuit (e.g., application specific integrated circuits (ASIC)) for realizing one or more functions.

(Other Embodiments)

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-128533, filed on Jun. 26, 2015, which is hereby incorporated by reference wherein in its entirety.

What is claimed is:

1. An image processing apparatus, comprising:
on or more processors: and
a memory storing instructions which, when the instructions are executed by the one or more processors, cause the image processing apparatus to function as:
a first acquiring unit configured to acquire information relating to a depth distribution of an object as map data with a first resolution;
a second acquiring unit configured to acquire image data of the object as image data with a second resolution higher than the first resolution;
a shaping unit configured to shape the map data based on the image data acquired by the second acquiring, unit;
a first reducing unit configured to reduce the image data acquired by the second acquiring unit so as to conform to the first resolution: and
a second reducing unit configured to reduce the image data acquired by the second acquiring unit for display so as to conform to a resolution lower than the second resolution,
wherein the shaping unit shapes the map data with the first resolution with reference to the image data of which the resolution has been changed from the second resolution to the first resolution, and
wherein the second reducing unit suppresses alias generated by reduction of the image more strongly than that suppressed by the first reducing unit.

2. The image processing apparatus according to claim 1, wherein, when a pixel value of a pixel of interest and pixel values of its surrounding pixels are smoothed with respect to the pixel of interest and pixel values of its surrounding pixels are smoothed with respect to the pixel of interest in the map data, the shaping unit increases a weight of smoothing with respect to the output of the surrounding pixels as the pixel value of the pixel of interest becomes closer to the pixel values of the surrounding pixels.

3. The image processing apparatus according to claim 1, wherein the shaping unit shapes the map data with reference to the image data which has been reduced by the first reducing unit.

4. The image processing apparatus according to claim 1, further comprising:
an aligning unit configured to correct a position deviation between the map data acquired by the first acquiring unit and the image data acquired by the second acquiring unit,
wherein the shaping unit shapes the map data which has been corrected by the aligning unit.

5. The image processing apparatus according to claim 1, further comprising:
an image acquiring unit configured to acquire a plurality of image data exhibiting parallax,
wherein the first acquiring unit acquires data with the first resolution, which has been generated by using the plurality of image data.

6. The image processing apparatus according to claim 5, further comprising:
a map generating unit configured to generate the map data with lower resolution than the resolution of the plurality of image data by using image data extracted from the plurality of image data at a predetermined pixel interval so as to output the map data to the shaping unit.

7. The image processing apparatus according to claim 1, wherein the shaping a bilateral filter processing that refers to the image data of the object.

8. An imaging apparatus, comprising;
an image processing apparatus, comprising:
one or more processors; and
a memory storing instructions which, when the instructions are executed by the one or more processors, cause the image processing apparatus to function as;
a first acquiring unit configured to acquire information relating to a depth distribution of an object as map data with a first resolution;
a second acquiring unit configured to acquire image data of the object as image data with a second resolution higher than the first resolution;
a shaping unit configured to shape the map data based on the image data acquired by the second acquiring unit;
a first reducing unit configured to reduce the image data acquired by the second acquiring unit so as to conform to the first resolution; and
a second reducing unit configured to reduce the image data acquired by the second acquiring unit for display so as to conform to a resolution lower than the second resolution, wherein the shaping unit shapes the map data with the first resolution with reference to the image data of which the resolution has been changed from he second resolution to the first resolution, and wherein the second reducing unit suppresses alias generated by reduction of the image more strongly than that suppressed by the first reducing unit, an imaging element that images an object through an imaging optical system, wherein the imaging element has a plurality of photoelectric converters which receive and photoelectrically convert light beams which have passed through different pupil areas of the imaging optical system, and wherein the first acquiring unit acquires information relating to a depth distribution of an object front signals respectively output from the plurality of photoelectric converters.

9. An imaging apparatus according to claim 8, wherein the first acquiring unit calculates an amount of defocus for each pixel-of-interest position using signals respectively output from the plurality of photoelectric converters so as to acquire information relating to depth distribution of an object.

10. An image processing method to be executed by an image processing apparatus that acquires information relating to a depth distribution of an object to process map data, the image processing method comprising:

acquiring information relating to a depth distribution of an object as map data with a first resolution and then acquiring image data of the object as image data with a second resolution higher than the first resolution; and shaping the map data based on the image data acquired in the acquiring step reducing, by at least one processor programmed to operate as a first reducing unit, the image data with the second resolution so as to conform to the first resolution; and reducing, by the at least one processor programmed to operate as a first reducing unit, the image data with the second resolution so as to conform to a resolution lower than the second resolution, wherein, in shaping, the map data with the first resolution is shaped with reference to the image data of which the resolution has been changed from the second resolution to the first resolution, and wherein the second reducing unit suppresses alias generated by reduction of the image more strongly than that suppressed by the first reducing unit.

11. A non-transitory recording medium storing a program for causing a computer of an image processing apparatus to execute the steps of an image processing method, the method comprising:

acquiring information relating to a depth distribution of an object as map data with a first resolution and then acquiring image data of the object as image data with a second resolution higher than the first resolution; and shaping the map data based on the image data acquired in the acquiring step reducing, by at least one processor programmed to operate as a first reducing unit, the image data with the second resolution so as to conform to the first resolution; and reducing, by the at least one processor pro rammed to operate as a second reducing unit, the image data with the second resolution for display so as to conform to a resolution lower than the second resolution, wherein, in shaping, the map data with the first resolution is shaped with reference to the image data of which the resolution has been changed from the second resolution to the first resolution, and wherein the second reducing unit suppresses alias generated by reduction of the image more strongly than that suppressed by the first reducing unit.

* * * * *